(12) United States Patent
Capelli et al.

(10) Patent No.: US 12,339,462 B2
(45) Date of Patent: Jun. 24, 2025

(54) HEAD-MOUNTED DISPLAY SYSTEM HAVING A WEARABLE CARRIER MEMBER TO MOVABLY SUPPORT ONE OR MORE HEAD-MOUNTED DISPLAYS

(71) Applicant: BHS Technologies GmbH, Innsbruck (AT)

(72) Inventors: Mark Capelli, Innsbruck (AT); Michael Santek, Götzens (AT)

(73) Assignee: BHS Technologies GmbH, Innsbruck (AT)

( * ) Notice: Subject to any disclaimer, the term of this patent is extended or adjusted under 35 U.S.C. 154(b) by 0 days.

(21) Appl. No.: 17/571,568

(22) Filed: Jan. 10, 2022

(65) Prior Publication Data

US 2022/0221727 A1 Jul. 14, 2022

(30) Foreign Application Priority Data

Jan. 11, 2021 (EP) .................................... 21150964

(51) Int. Cl.
*G09G 5/00* (2006.01)
*G02B 27/01* (2006.01)

(52) U.S. Cl.
CPC ..... *G02B 27/0176* (2013.01); *G02B 27/0172* (2013.01); *G02B 2027/0134* (2013.01); *G02B 2027/0163* (2013.01)

(58) Field of Classification Search
CPC ............ G02B 27/0176; G02B 27/0172; G02B 2027/0134; G02B 2027/0163
USPC .......................................................... 345/8
See application file for complete search history.

(56) References Cited

U.S. PATENT DOCUMENTS

| | | | |
|---|---|---|---|
| 5,815,126 A | 9/1998 | Fan et al. | |
| 2010/0214402 A1* | 8/2010 | Schute | G02B 23/18 396/14 |
| 2016/0004339 A1* | 1/2016 | Koara | G06F 3/03548 345/173 |
| 2016/0021724 A1* | 1/2016 | Kinderman | H05B 45/46 315/192 |
| 2016/0116748 A1* | 4/2016 | Carollo | H04N 13/286 359/632 |
| 2016/0213335 A1* | 7/2016 | Hwang | A61B 8/464 |
| 2016/0313561 A1* | 10/2016 | Chenchev | G02B 27/0172 |
| 2017/0102549 A1* | 4/2017 | Lee | G02B 27/0179 |
| 2017/0322410 A1* | 11/2017 | Watson | H04N 13/254 |
| 2018/0219310 A1* | 8/2018 | Lukofsky | H01R 12/52 |
| 2018/0302604 A1* | 10/2018 | Zhou | H04N 19/176 |
| 2019/0068959 A1* | 2/2019 | Ukai | G02B 6/122 |
| 2019/0254754 A1* | 8/2019 | Johnson | G06T 19/006 |

(Continued)

OTHER PUBLICATIONS

Communication Pursuant to Article 94(3) EPC Dated Nov. 5, 2024 From the European Patent Office Re. Application No. 21150964.1. (7 Pages).

*Primary Examiner* — Jonathan M Blancha

(57) ABSTRACT

The present invention relates to a head-mounted display system (1, 1'), comprising
at least one head-mounted display (10a, 10b) comprising at least one display portion (11a, 11b),
a carrier member (20) to be worn by an operator to movably support the at least one head-mounted display (10a, 10b), and
at least one control device (30, 30') configured to control the at least one head-mounted display (10a, 10b),
wherein the at least one control device (30, 30') is spatially separated from the head-mounted display (10a, 10b).

12 Claims, 3 Drawing Sheets

(56) References Cited

U.S. PATENT DOCUMENTS

2020/0225492 A1\* 7/2020 Williams ........... G02B 27/0176
2021/0315643 A1\* 10/2021 Brisson .................... G09G 5/00

\* cited by examiner

HEAD-MOUNTED DISPLAY SYSTEM HAVING A WEARABLE CARRIER MEMBER TO MOVABLY SUPPORT ONE OR MORE HEAD-MOUNTED DISPLAYS

RELATED APPLICATION

This application claims the benefit of priority of Europe Patent Application No. 21150964.1 filed on Jan. 11, 2021, the contents of which are incorporated herein by reference in their entirety.

FIELD AND BACKGROUND OF THE INVENTION

The present invention relates to a head-mounted display system.

Head-mounted display systems are used for different applications like displaying images of a medical imaging device to medical personal during a medical procedure. However, an operator wearing a head-mounted display system may have to change views, for example, between microscopic images displayed by the head-mounted display and the real environment for macroscopic procedures. Simply taking off the head-mounted display system for a view on the real scene is disadvantageous in the medical field with respect to a required sterile environment. Therefore, known head-mounted display systems are equipped with semi-transparent displays to display images in parallel to providing a view on the real environment. Due to the semitransparent display, the view on the real environment is shaded, which results in less visibility of details and respective risks. Accordingly, head-mounted display systems have been proposed that provide a display configured to be manually pivotable out of an operator's viewing field. However, due to the electronic control elements of the display, the weight of such display requires a comparably rigid support structure capable of securely holding the display in each pivoted position. Further, the weight of the display may cause inconveniences for an operator in at least some of the pivot positions.

Accordingly, it is an object of the present invention to provide an improved head-mounted display system.

SUMMARY OF THE INVENTION

The object is solved by a head-mounted display system according to claim 1. Further aspects of the present invention are subject to the dependent claims.

According to the present invention, the head-mounted display system comprises at least one head-mounted display comprising at least one display portion, a carrier member to be worn by an operator to movably support the at least one head-mounted display, and at least one control device configured to control the at least one head-mounted display, wherein the at least one control device is spatially separated from the head-mounted display.

Due to the spatial separation of the control device, such as a display driver board, from the head-mounted display, the weight of the head-mounted display is decreased accordingly. Therefore, requirements with respect to a support structure of a movable head-mounted are reduced. Furthermore, the weight distribution of a respective head-mounted display system can be improved. The control device may be attached to the carrier member or may be otherwise attached to the head-mounted display system. The control device may also be configured to be connected to the head-mounted display system by a wired or wireless connection instead of being attached to the head-mounted display system as such.

In some embodiments, the at least one head-mounted display is pivotably supported by the carrier member, and the at least one control device is connected to the at least one head-mounted display by at least one flexible conductive element.

For example, the control device is attached to the carrier member, wherein the flexible conductive element transmits control signals from the control device to the head-mounted display. Due to the flexibility of the flexible conductive element, the head-mounted display can be pivoted with respect to the carrier member without affecting the connection to the control device. Alternatively or in addition, the control device may be configured to transmit control signals wirelessly, as already indicated above.

In particular, the at least one flexible conductive element is a coaxial cable, preferably a micro coaxial cable.

A coaxial cable is mechanically robust with respect to the pivoting of the head-mounted display. Alternatively, rigid-flex circuit boards or a flat ribbon cable may be used to connect with the head-mounted display. However, a coaxial cable also provides more flexibility when the head-mounted display is configured to provide a lateral movement with respect to the carrier member in addition or alternatively to a pivot movement. A lateral movement may be implemented to move the head-mounted display out of an operator's view alternatively or in addition to a respective pivot movement and/or to adapt the head-mounted display to an individual interocular distance of an operator and/or for an individual diopter compensation.

According to some embodiments, the inner core of the coaxial cable provides data transfer line surrounded by a first isolating layer, followed by a shielding layer and a subsequent second isolating layer.

The above layer structure shields the inner core as high-frequency data-line from electromagnetic disturbances. Similarly, a rigid-flex circuit board or a flat ribbon cable as alternatives to the coaxial cable preferably provide a data line sandwiched between two isolating layers, each of which followed by a shielding layer and a subsequent further isolating layer.

Advantageously, the head-mounted display system comprises at least two head-mounted displays each of which comprises at least one display portion, and wherein the at least one control device is configured to control both of the at least two head-mounted displays based on a control input.

Accordingly, when the head-mounted display system comprises more than one head-mounted display, the head-mounted displays can be controlled by one control device.

In some embodiments with more than one head-mounted display, each of the head-mounted displays is connected to the control device by at least one flexible conductive element, and wherein the at least one control device is configured to control both of the at least two head-mounted displays by a respective one of the flexible conductive elements.

Accordingly, the control device is configured to control the head-mounted displays based on a single control input. The single control input is not restricted to a single control command and may also comprise a set of control commands. Alternatively, the head-mounted displays are connected in series and the control command or control commands are transmitted from the control device to the first of the head-mounted displays and from the first of the head-mounted displays to the subsequent one and so on.

In particular, the control device is configured to control each of the at least two head-mounted displays independently.

Therefore, the control device may comprise a processor unit to process a received control input and to assign a control command or control commands to one and/or the other of the head-mounted display systems. Such assignment may depend on a preset configuration, e.g. to display images to both of the head-mounted displays while displaying text information only to one of the head-mounted displays. The control may also be configured to process images to be displayed, e.g. to provide 3D images by providing respectively processed images to a head-mounted display associated with a right eye of an operator and a head-mounted display associated with a right eye of a user.

According to some embodiments, the head-mounted display system comprises at least two head-mounted displays each of which comprises at least one display portion, and two control devices each of which is connected to one of the at least two head-mounted displays by a respective one of the flexible conductive elements.

In such configuration, the at least two head-mounted displays are not controlled by a common control device but each head-mounted display provides its own control device assigned thereto by the respective connection. As a result, the respective control devices may be less complex, e.g. may not require a processor unit capable of processing a control input with respect to an individual assignment of control commands. Further, more than one control device may be implemented for redundancy reasons since the risk of a simultaneous failure of all control devices is minor. Accordingly, the risk of a total display loss is reduced.

Advantageously, the control device comprises a SPS-connector.

Accordingly, the control device is configured to receive further signals and/or processed data without requiring a respective capability to provide such signals and/or process data by the control device itself. For example, respective signals and/or data may be provided by a IMU (inertial measurement unit) configured to detect a position and/or orientation of the head-mounted display system to adapt images to be displayed in accordance with such position and/or orientation of the head-mounted display system. Alternatively or in addition, a CAN bus may be connected to the SPS-connector to provide signals and/or data of other external devices.

In some embodiments, the head-mounted display system comprises a motor for pivoting the at least one head-mounted display with respect to the carrier member, and wherein the motor is preferably arranged offset from the pivot axis of the at least one head-mounted display.

In particular with respect to a required sterile handling, a manual pivoting of the head-mounted display can be avoided by the motor. A respective movement of the head-mounted display may be controlled by tracked gestures, tracked head and/or eye movements, a footswitch and/or other control mechanisms allowing a sterile operation. Preferably, the respective control mechanisms may not require a movement of an operator's hand associated with a current procedure of the operator.

The arrangement of the motor offset from the pivot axis of the head-mounted display may improve the weight distribution. Further, the center of gravity may be displaced from a leading position to a more rearward position of the head-mounted display. Accordingly, a tendency of the head-mounted display to fall down or to provide a pulling force when an operator's head is leant forward may be reduced.

Since the control device may provide a flexible connection to the head-mounted display, the offset of the motor does not interfere with such connection. In other words, since the control device may be held stationary with only the head-mounted display being pivoted, the motor may be offset from the pivot axis without further adaptions.

Preferably, the head-mounted display system is configured to display images of a medical imaging device.

As already indicated by examples with respect to medical procedures, the inventive head-mounted display system provides specific advantages with respect to a sterile handling and free-hands requirements in view of medical procedures.

In some embodiments, the medical imaging device is a microscope.

The use of the head-mounted system according to the invention for displaying images of a medical microscope, preferably a robotic medical microscope, allows an operator like a surgeon to change the view from microscopic to macroscopic and vice versa in a sterile manner and with a head-mounted display system with improved ergonomics with respect to weight and weight distribution.

In some embodiments, the medical imaging device is an endoscope.

Here, the same advantages as with respect to the microscope apply.

Further advantages, aspects and details of the disclosure are subject to the claims, the following description of preferred embodiments applying the principles of the disclosure and drawings. In the figures, identical reference signs denote identical features and functions.

DESCRIPTION OF SPECIFIC EMBODIMENTS OF THE INVENTION

Figure 1:
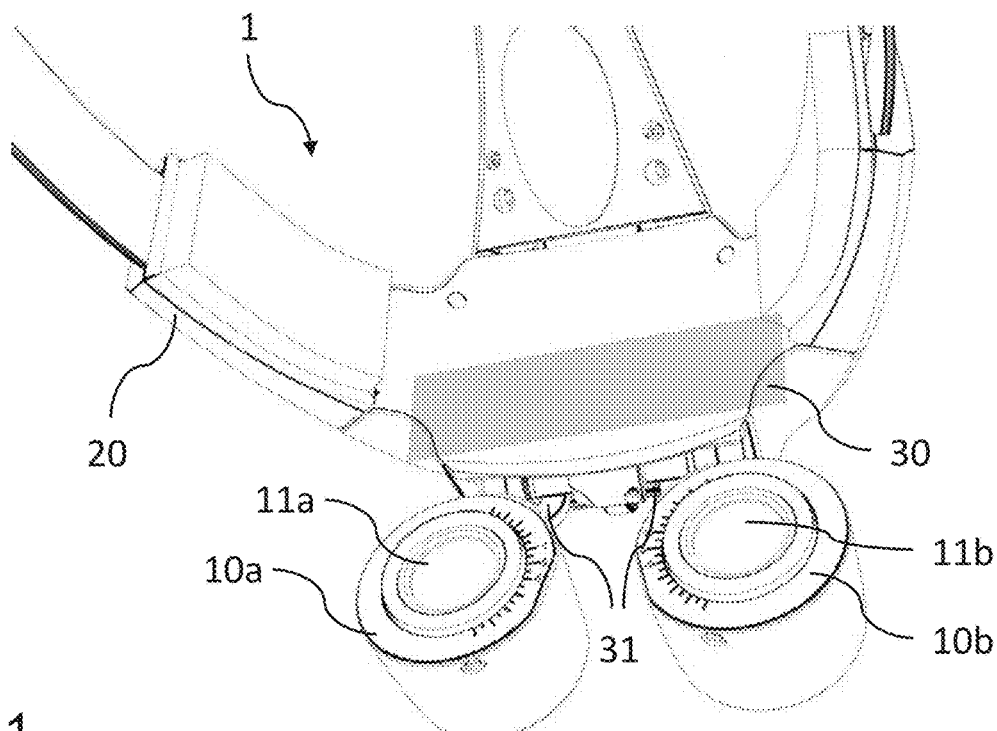
FIG. 1 is a schematic perspective view of a head-mounted display system with a control device according to a first exemplary embodiment.

FIG. 1 shows a schematic perspective view of a head-mounted display system 1 with a control device 30 according to a first exemplary embodiment. The head-mounted display system 1 further comprises a carrier member 20 and two head-mounted displays 10a and 10b each of which comprising a display portion 11a and 11b, respectively. The head-mounted displays are pivotably supported by the carrier member 20.

The control device 30 is configured to provide images of a medical imaging device (not shown), like a microscope or endoscope, to the head-mounted displays 10a, 10b and the display portions 11a, 11b, respectively. Further, the control device 30 is configured to control the displayed images, for example, by adjusting a contrast, brightness and/or magnification. Alternatively or in addition, the control device 30 may be configured to also provide other information, like text information or optical alert signal, to at least one of the head-mounted display systems 10a, 10b and/or to control further functions independent of displaying images and/or other information. The control device 30 may be also configured to receive signals from the head-mounted displays 10a, 10b.

To provide the head-mounted displays 10a, 10b with respective control signals, each of the head-mounted displays 10a, 10b is connected to the control device 30 by a flexible conductive element, here, a coaxial cable 31. The respective ends of the respective coaxial cable 31 to be connected with one of the head-mounted displays 10a, 10b are directly connected to the respective display portions 11a, 11b. In an alternative embodiment, the ends of the respective coaxial cables 31 may also be connected to a processor of the respective head-mounted displays 10a, 10b to further process image signals or the provide signals to another component different from the display portion 11a, 11b.

According to the first embodiment, the control device 30 is configured as mono-processing unit. i.e. both head-mounted displays 10a and 10b receive the same signals according to a control input to the control device 30.

Figure 2:
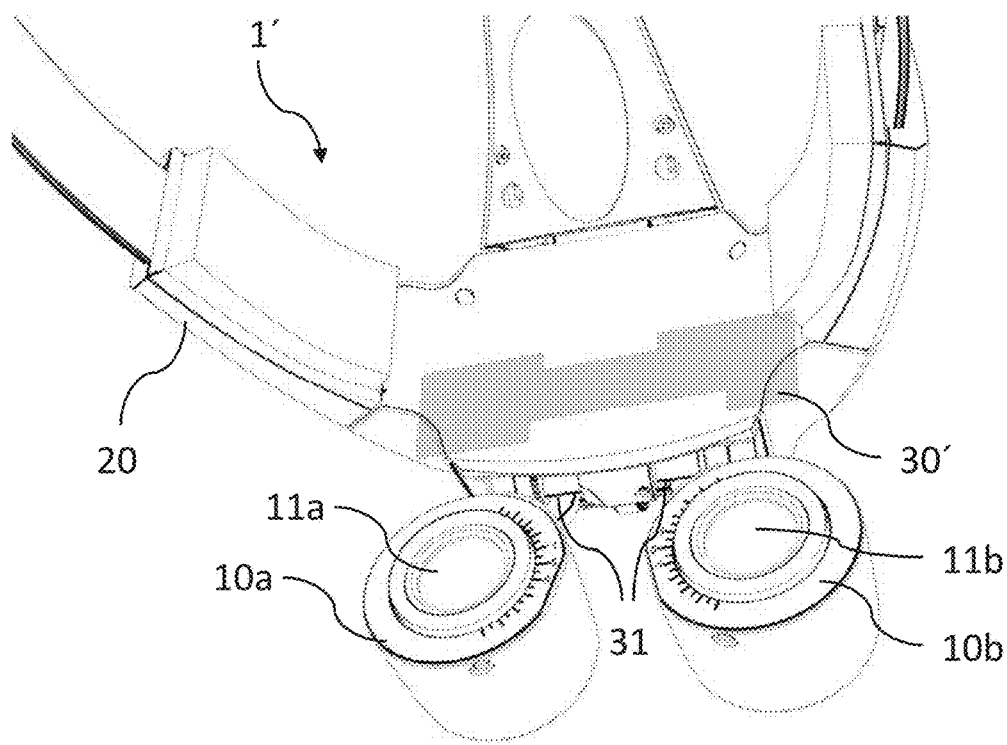
FIG. 2 is a schematic perspective view of a head-mounted display system with a control device according to a second exemplary embodiment.
Figure 4:
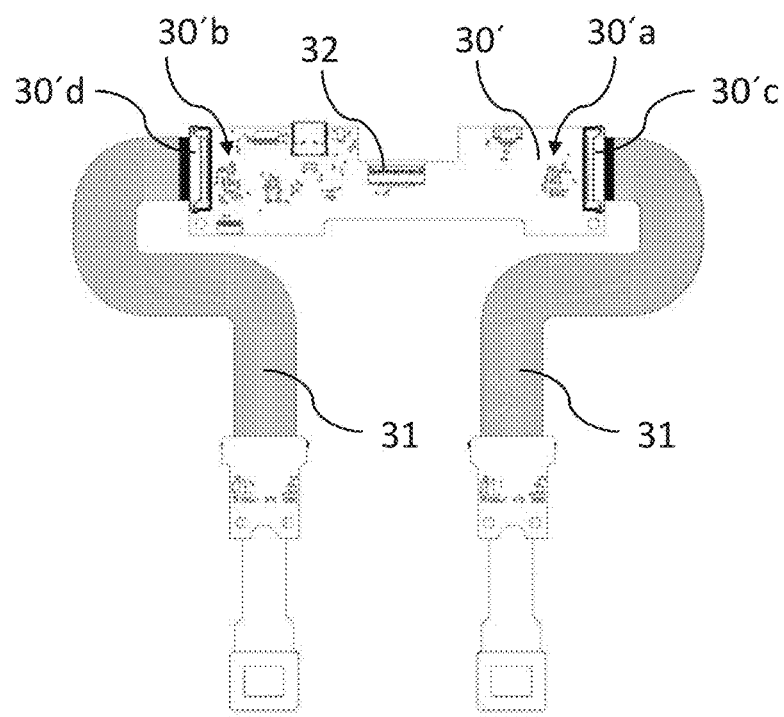
FIG. 4 is a schematic view of the control device according to the second embodiment and flexible conductive elements.

FIG. 2 shows a schematic perspective view of a head-mounted display system 1' with a control device 30' according to a second exemplary embodiment. The second embodiment differs from the first embodiment in that the control device 30' is configured as stereo-processing unit, i.e. the head-mounted displays 10a and 10b can be controlled independently. Accordingly, the control device 30' comprises two distinct processing units 30'a, 30'b (FIG. 4). In an alternative embodiment, a common processor is portioned accordingly two provide such functionality. According to the second embodiment, the two processing units 30'a, 30'b are configured to process a control input differently with respect to the assignment of control signals to the respective head-mounted display 10a, 10b connected thereto. Neither all of the control signals derived from the control input to be assigned to the head-mounted displays 10a, 10b have to be different nor control signals have to be different in any event. Accordingly, the independent control of the head-mounted displays 10a, 10b may depend, for example, on a type of a control input, predetermined settings and/or defined trigger events. For example, in a two-dimensional displaying mode each of the processing units 30'a, 30'b of the control device 30' provides the same image signals to each of the head-mounted displays 10a, 10b and display portions 11a, 11b, respectively. However, when the control input or a user input as trigger event requests a three-dimensional displaying mode, at least one of the processing units 30'a, 30'b of the control device 30' adapts the imaging data accordingly to provide different images to display portions 11a, 11b to reproduce a three-dimensional impression. In an alternative embodiment, the stereo-processing unit may receive separate control inputs for each of the head-mounted displays 10a, 10b. In other words, the stereo-processing unit provides two separate signal channels.

Figure 3:
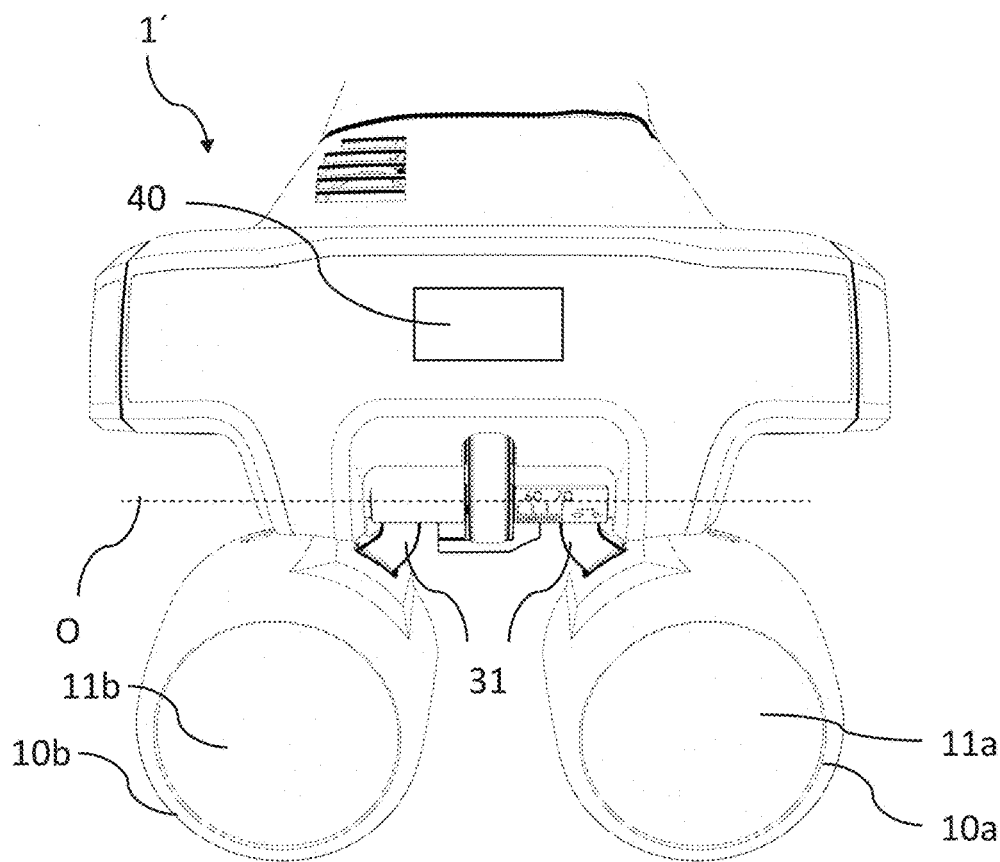
FIG. 3 is a schematic front view on the head-mounted display system according to the second embodiment.

FIG. 3 shows a schematic front view on the head-mounted display system 1' according to the second embodiment. However, the following description may be also applicable analogously to the first embodiment.

As indicated by the pivot axis O, the head-mounted displays 10a, 10b are pivotably supported by the carrier member 20. Here, the head-mounted displays 10a. 10b can be pivoted independently from each other. However, in a variant, the head-mounted display system 1' may be configured to pivot the head-mounted displays 10a, 10b simultaneously.

The control device 30' is arranged stationary in the carrier member 20, when the head-mounted displays 10a, 10b are or at least one of the head-mounted displays 10a, 10b is pivoted around the axis O. Accordingly, there is a relative movement between the control device 30 and the respective head-mounted display 10a, 10b. However, due to the coaxial cable 31, the relative movement is neither impeded in principle nor the connection is prone to broke.

Further, the pivoting of the head-mounted displays 10a, 10b is implemented by a motor 40. An independent movement of the head-mounted displays 10a, 10b is implements by a respectively switchable transmission system (not shown). In an alternative embodiment, each of the head-mounted displays 10a, 10b may be driven by separate motors. In the exemplary embodiment, the motor 40 is arranged offset from the pivot axis O. Accordingly, the weight of the motor 40 is displaced to a position providing a better balance of the head-mounted display system 1' and therefore an improved comfort for an operator wearing the head-mounted display system 1' may be achieved.

FIG. 4 shows a schematic view of the control device 30' according to the second embodiment and flexible conductive elements. More precisely, two coaxial cables 31 are each connected to the control device 30' via connection interfaces 30'c, 30'd. The connection interface 30'c is associated with the processing unit 30'a to provide control signals to the head-mounted display 10a and the connection interface 30'd is associated with the processing unit 30'b to provide control signals to the head-mounted display 10b. Further, the control device 30' comprises a SPS-connector 32 to allow the reception of further signals and commands without providing respective components for such signal generation on the control device 30'.

Figure 5:
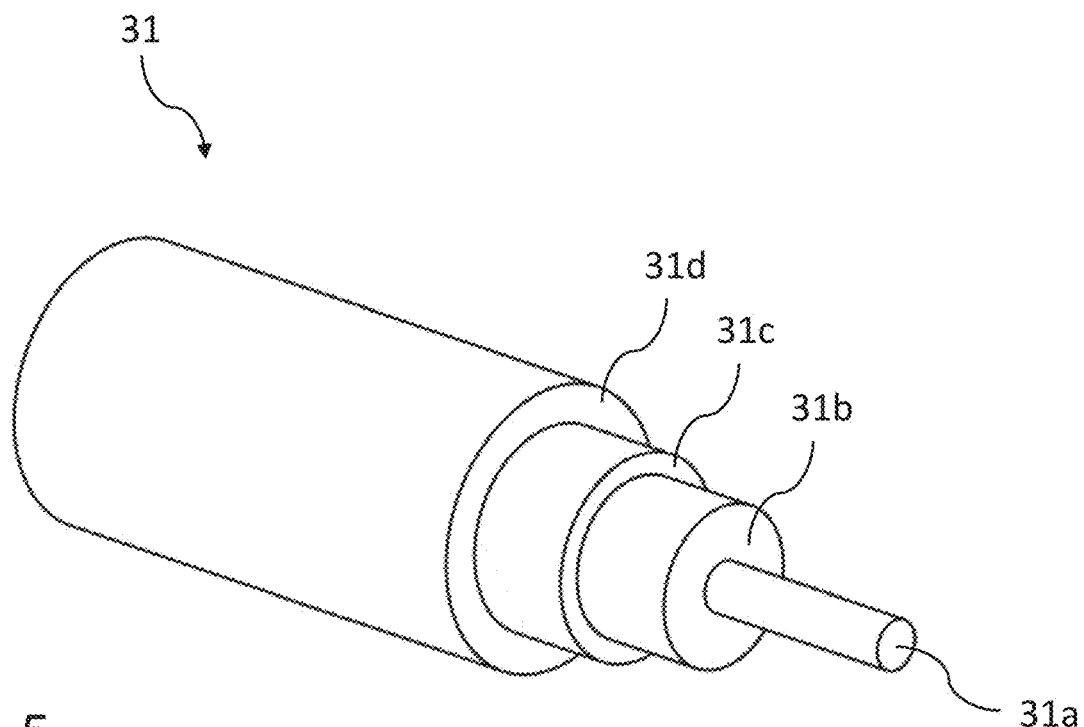
FIG. 5 is a partial cross-sectional perspective view of a coaxial cable as exemplary embodiment of a flexible conductive element.

FIG. 5 illustrates a partial cross-sectional perspective view of a coaxial cable 31 as exemplary embodiment of a flexible conductive element and as shown FIGS. 1 to 5. A data transfer line 31a accomplishes the data transfer. To shield the data transfer line 31a from electromagnetic interferences, the data transfer line 31a is surrounded by a first isolating layer 31b followed by a shielding layer 31c and a subsequent second isolation layer 31d.

Figure 6:
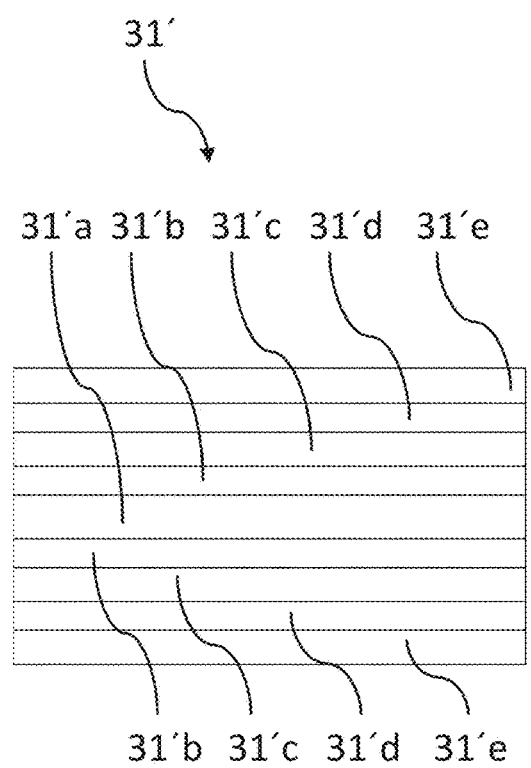
FIG. 6 is a cross-sectional view of a rigid-flex circuit board shielded on both sides as further exemplary embodiment of a flexible conductive element.

FIG. 6 shows a cross-sectional view of a rigid-flex circuit board 31' shielded on both sides as further exemplary embodiment of a flexible conductive element. The rigid-flex circuit board 31' provides a similar configuration as the coaxial cable 31 but the data transfer line 31'a is not surrounded by respective layers but sandwiched by such layers. Specifically, the data transfer line 31'a is sandwiched between two first isolating layers 31'b followed by respective shielding layers 31'c and subsequent second isolating layers 31'd. The layer configuration is covered by a cover layer 31'e, for example, made of polyimide.

Figure 7:
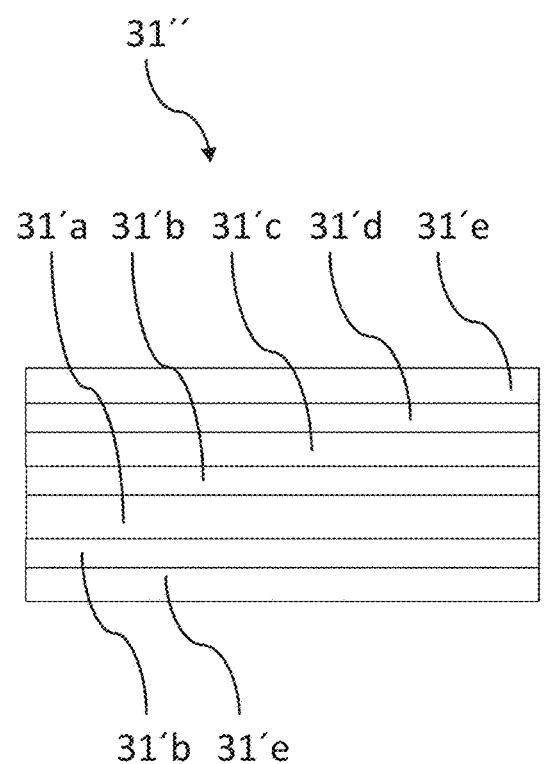
FIG. 7 is a cross-sectional view of a rigid-flex circuit board shielded on one side as further exemplary embodiment of a flexible conductive element.

As a variant, FIG. 7 shows a cross-sectional view of a rigid-flex circuit board 32' shielded on one side as further exemplary embodiment of a flexible conductive element. Starting from the data transfer line 31'a to the outside in one direction, the rigid-flex circuit board 32' provides a first isolating layer adjacent to the data transfer line 31'a followed by a shielding layer 31'c, a subsequent second isolating layer 31'd and a cover layer 31'e. On the opposite side of the data transfer line 31'a, a first isolating layer 31'b is disposed adjacent to the data transfer lien 31'a followed by a cover layer 31'e.

It is to be noted that the given examples are specific embodiments and not intended to restrict the scope of protection given in the claims. In particular, single features of one embodiment may be combined with another embodiment. Further, different components of the head-mounted display systems as described may be substituted by other components. For example, the rigid-flex circuit board may be substituted by a flat ribbon cable.

LIST OF REFERENCE SIGNS 1, 1' head-mounted display system
10a, 10b head-mounted display
11a, 11b display portion
20 carrier member
30, 30' control device
30'a, 30'b processing unit
30'c, 30'd connection interface
31 coaxial cable (flexible conductive element)
31', 31' rigid-flex circuit board (flexible conductive element)
31a, 31'a data transfer line
31b, 31'b first isolating layer
31c, 31'c shielding layer
31d, 31'd second isolating layer
31'e cover layer
32 SPS-connector
40 motor
O pivot axis

What is claimed is:

1. A head-mounted display system (1, 1'), wherein the head-mounted display system (1, 1') is configured to display images of a medical imaging device being a microscope or an endoscope, the head-mounted display system (1, 1') comprising:
at least one head-mounted display (10a, 10b) comprising:
at least one display portion (11a, 11b),
a carrier member (20) having a forehead portion configured to be worn at a forehead level of an operator to movably support the at least one head-mounted display (10a, 10b), and
at least one control device (30, 30') configured to: receive, using a SPS-connector (32), signals and/or processed data from at least one of an (Inertial Measurement Unit (IMU) and a Controller Area Network (CAN) bus and to control the at least one head-mounted display (10a, 10b) accordingly,
detect a position and/or orientation of the head-mounted display system based on the signals and/or processed data from the IMU,
adapt at least one of a contrast and a brightness of the images of the medical imaging device to be displayed in accordance with the position and/or orientation of the head-mounted display system;
wherein the at least one control device (30, 30') is spatially separated from the head-mounted display (10a, 10b); wherein the at least one head-mounted display (10a, 10b) is pivotably supported by the carrier member (20) about a pivot axis (O) arranged in the forehead portion of the carrier member 20, and
wherein the at least one control device (30, 30') is connected to the at least one head-mounted display (10a, 10b) by at least one flexible conductive element (31, 31', 31").

2. The head-mounted display system (1, 1') according to claim 1, wherein the at least one flexible conductive element is a coaxial cable (31).

3. The head-mounted display system according (1, 1') to claim 2, wherein the inner core of the coaxial cable (31) provides data transfer line (31a) surrounded by a first isolating layer (31b), followed by a shielding layer (31c) and a subsequent second isolating layer (31d).

4. The head-mounted display system (1, 1') according to claim 2, wherein the coaxial cable (31) is a micro coaxial cable.

5. The head-mounted display system (1, 1') according to claim 1, wherein the head-mounted display system (1, 1') comprises at least two head-mounted displays (10a, 10b) each of which comprises at least one display portion (11a, 11b), and wherein the at least one control device (30, 30') is configured to control both of the at least two head-mounted displays (10a, 10b) based on a control input.

6. The head-mounted display system (1, 1') according to claim 5, wherein each of the head-mounted displays (10a, 10b) is connected to the control device (30, 30') by the at least one flexible conductive element (31, 31'), and wherein the at least one control device (30, 30') is configured to control both of the at least two head-mounted displays (10a, 10b) by a respective one of the flexible conductive elements (31, 31', 31").

7. The head-mounted display system (1') according to claim 5, wherein the control device (30') is configured to control each of the at least two head-mounted displays (10a, 10b) independently.

8. The head-mounted display system (1, 1') according to claim 1, wherein the head-mounted display system (1, 1') comprises at least two head-mounted displays (10a, 10b) each of which comprises at least one display portion (11a, 11b), and two control devices (30, 30') each of which is connected to one of the at least two head-mounted displays (10a, 10b) by a respective one of the flexible conductive elements (31, 31', 31").

9. The head-mounted display system (1, 1') according to claim 1, wherein the head-mounted display system (1, 1') comprises a motor (40) for pivoting the at least one head-mounted display (10a, 10b) with respect to the carrier member (20).

10. The head-mounted display system (1, 1') according to claim 9, wherein the motor (40) is arranged offset from the pivot axis (O) of the at least one head-mounted display (10a, 10b).

11. The head-mounted display system (1, 1') according to claim 1, wherein the medical imaging device is the microscope.

12. The head-mounted display system (1, 1') according to claim 1, wherein the medical imaging device is the endoscope.

* * * * *